(12) United States Patent
Shibata

(10) Patent No.: US 10,805,504 B2
(45) Date of Patent: Oct. 13, 2020

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/212,832

(22) Filed: Dec. 7, 2018

(65) Prior Publication Data

US 2019/0182405 A1 Jun. 13, 2019

(30) Foreign Application Priority Data

Dec. 8, 2017 (JP) .................. 2017-236047

(51) Int. Cl.
*H04N 1/00* (2006.01)
*H04N 1/32* (2006.01)
(Continued)

(52) U.S. Cl.
CPC ..... *H04N 1/33376* (2013.01); *H04N 1/00307* (2013.01); *H04N 1/32518* (2013.01);
(Continued)

(58) Field of Classification Search
None
See application file for complete search history.

(56) References Cited

U.S. PATENT DOCUMENTS 9,210,732 B2   12/2015 Suzuki
2013/0044635 A1   2/2013 Suzuki
(Continued)

FOREIGN PATENT DOCUMENTS

JP   2013-042400 A   2/2013
JP   2013-214803 A   10/2013

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Beniyam Menberu
(74) *Attorney, Agent, or Firm* — Banner & Witcoff, Ltd.

(57) ABSTRACT

A communication device may receive first specific information from a first terminal device, establish a second wireless connection with a second terminal device after the first specific information has been received from the first terminal device, receive second specific information from the second terminal device after the second wireless connection has been established with the second terminal device, determine whether the first terminal device is identical to the second terminal device by using the first specific information and the second specific information in a case where the second specific information is received from the second terminal device, disconnect the second wireless connection in a case where it is determined that the first terminal device is not identical to the second terminal device, and not disconnect the second wireless connection in a case where it is determined that the first terminal device is identical to the second terminal device.

16 Claims, 11 Drawing Sheets

(51) Int. Cl.
  *H04N 1/44*    (2006.01)
  *H04W 76/14*   (2018.01)
  *H04W 76/15*   (2018.01)
  *H04W 84/12*   (2009.01)
  *H04N 1/333*   (2006.01)

(52) U.S. Cl.
  CPC .......... *H04N 1/4433* (2013.01); *H04W 76/14* (2018.02); *H04W 76/15* (2018.02); *H04N 2201/0044* (2013.01); *H04N 2201/0094* (2013.01); *H04W 84/12* (2013.01)

(56) References Cited

U.S. PATENT DOCUMENTS

| | | | |
|---|---|---|---|
| 2013/0260818 A1 | 10/2013 | Suzuki et al. | |
| 2015/0355874 A1* | 12/2015 | Kamoi | H04N 1/0023 358/1.15 |
| 2016/0316511 A1 | 10/2016 | Suzuki et al. | |
| 2016/0381717 A1* | 12/2016 | Sunagar | H04B 17/318 370/328 |
| 2017/0265232 A1* | 9/2017 | Miyata | H04W 4/80 |

\* cited by examiner

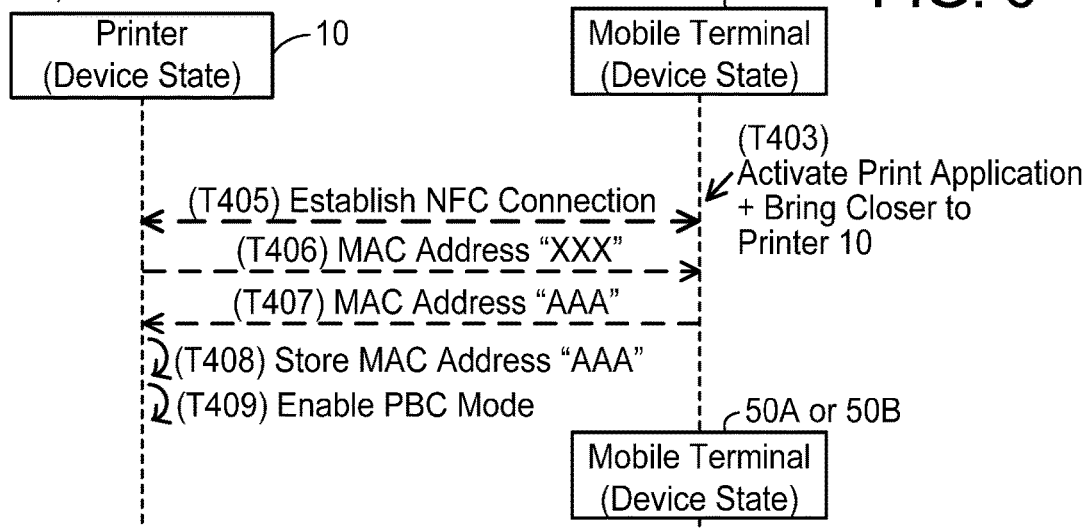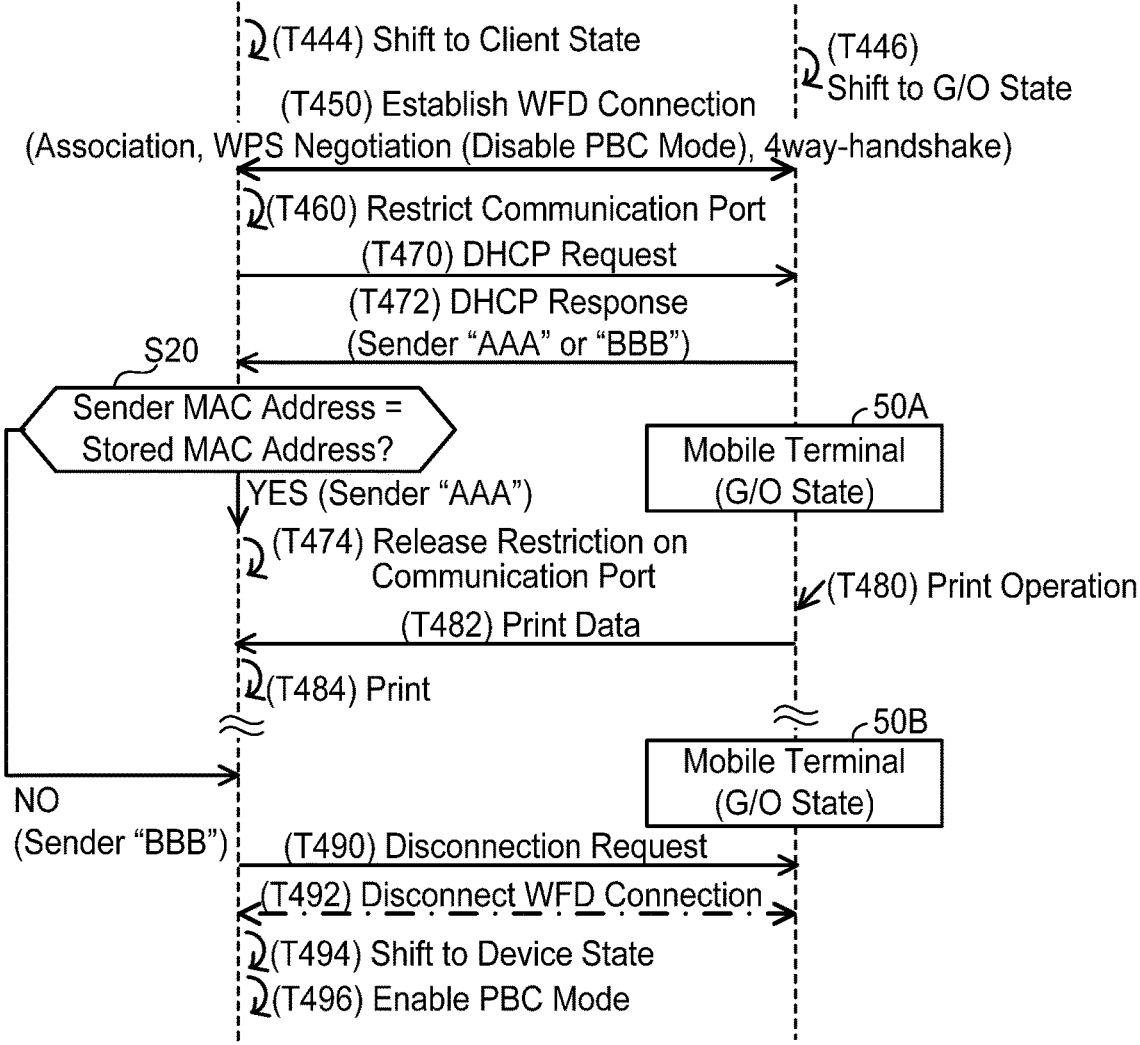
FIG. 6

(Comparative Example 2)

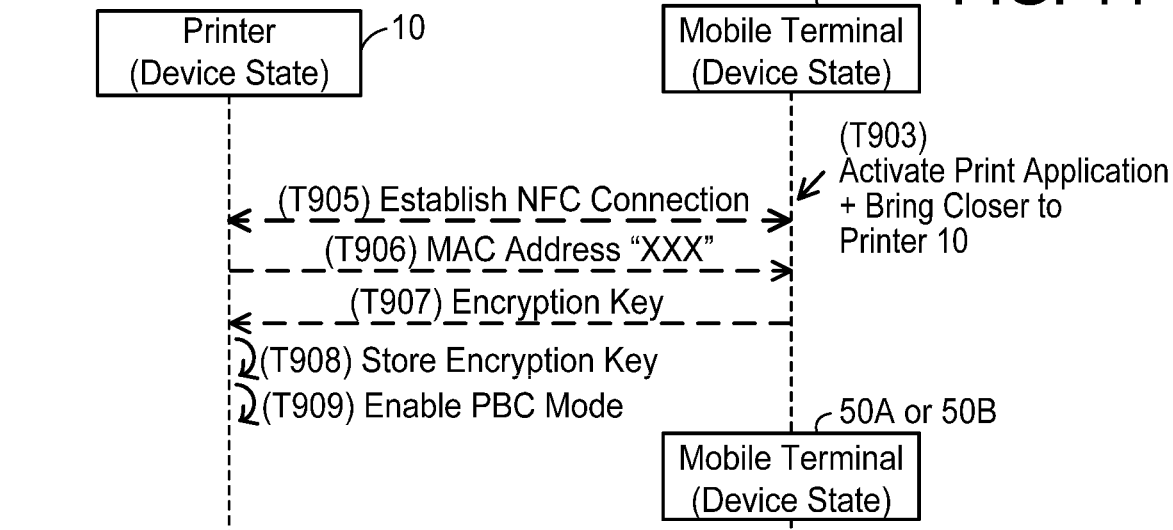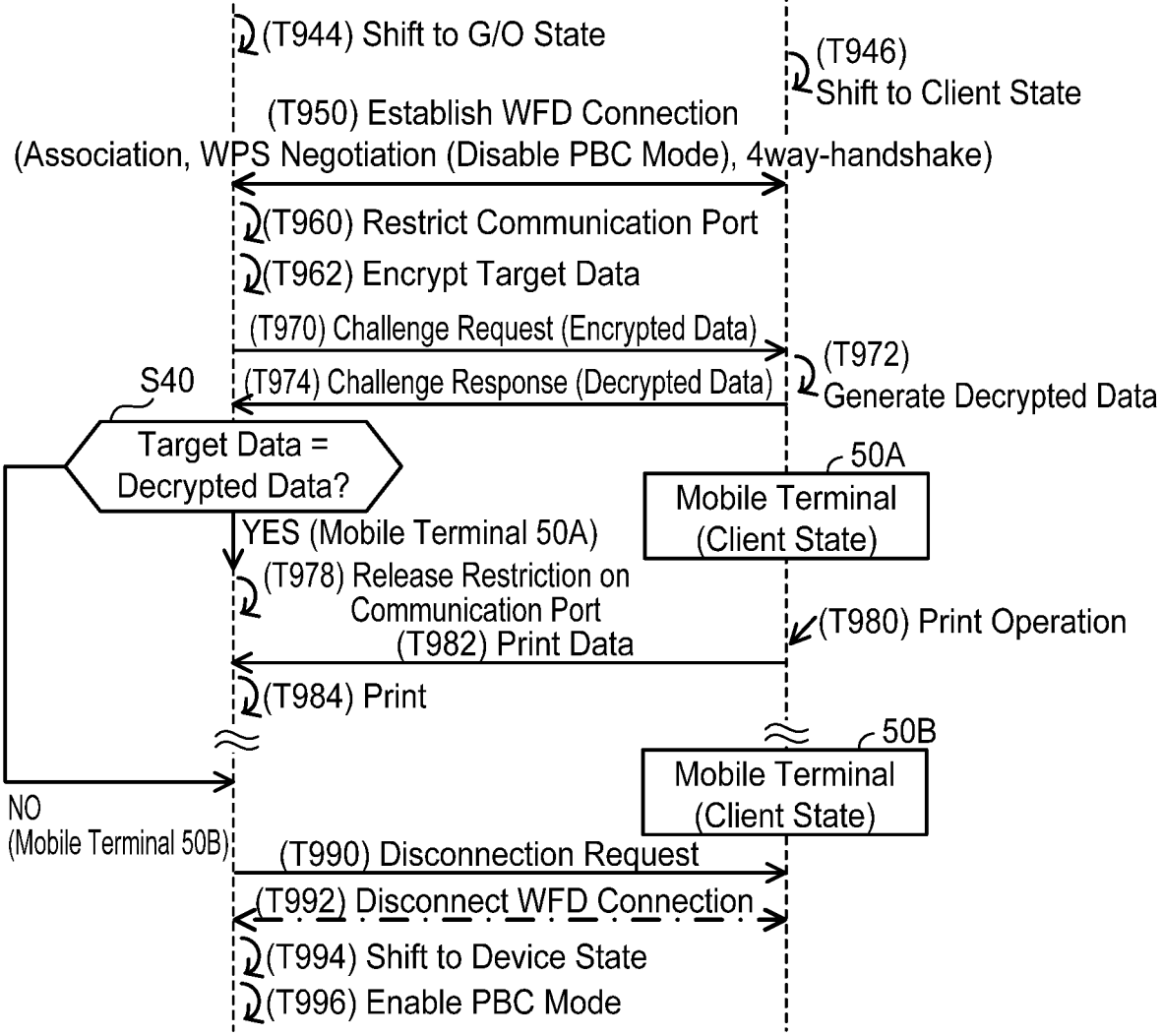
FIG. 11

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE

This application claims priority to Japanese Patent Application No. 2017-236047, filed on Dec. 8, 2017, the entire contents of which are incorporated herein by reference.

TECHNICAL FIELD

The disclosure herein discloses a communication device configured to establish a wireless connection with a terminal device.

BACKGROUND ART

A technique for establishing a wireless connection according to a WFD (abbreviation of Wi-Fi Direct) scheme (hereinbelow termed "WFD connection") between an MFP (abbreviation of Multi-Function Peripheral) and a mobile terminal is known. The MFP shifts to a mode in which various communications for establishing the WFD connection can be executed (that is, WFD=ON mode) when a wireless connection according to an NFC (abbreviation of Near Field Communication) scheme (hereinbelow termed "NFC connection") is established with the mobile terminal. Due to this, the MFP executes various communications with the mobile terminal to establish the WFD connection with the mobile terminal.

SUMMARY

In the above technique, after the MFP has shifted to the WFD=ON mode in response to an NFC connection having been established with a first mobile terminal, when the MFP receives a connection request from a second mobile terminal which is different from the first mobile terminal, the MFP may establish a WFD connection with the second mobile terminal. In this case, the MFP may not be able to establish a WFD connection with the first mobile terminal with which the NFC connection has been established.

The disclosure herein discloses a communication device configured to suitably establish a second wireless connection via a second wireless interface with a first terminal device after a first wireless connection via a first wireless interface with the first terminal device has been established.

A communication device disclosed herein may comprise: a first wireless interface; a second wireless interface; a processor; and a memory storing computer-readable instructions therein, the computer-readable instructions, when executed by the processor, causing the communication device to: in a case where a first wireless connection via the first wireless interface is established with a first terminal device, receive first specific information from the first terminal device via the first wireless interface by using the first wireless connection; after the first specific information has been received from the first terminal device, establish a second wireless connection via the second wireless interface with a second terminal device; after the second wireless connection has been established with the second terminal device, receive second specific information from the second terminal device; in a case where the second specific information is received from the second terminal device, determine whether the first terminal device is identical to the second terminal device by using the first specific information and the second specific information; and in a case where it is determined that the first terminal device is not identical to the second terminal device, disconnect the second wireless connection with the second terminal device that is different from the first terminal device, wherein in a case where it is determined that the first terminal device is identical to the second terminal device, the second wireless connection with the second terminal device that is identical to the first terminal device may not be disconnected.

A control method, computer-readable instructions, and a computer-readable recording medium storing the computer-readable instructions for implementation of the aforementioned communication device are also novel and useful. A communication system which comprises the aforementioned communication device and terminal device is also novel and useful.

BRIEF DESCRIPTION OF THE DRAWINGS

FIG. 6 shows a sequence diagram, of Case A4 in which whether MAC addresses are identical to each other is determined after the printer has shifted to a client state.

FIG. 11 shows a sequence diagram of a second embodiment.

EMBODIMENTS

Figure 1:
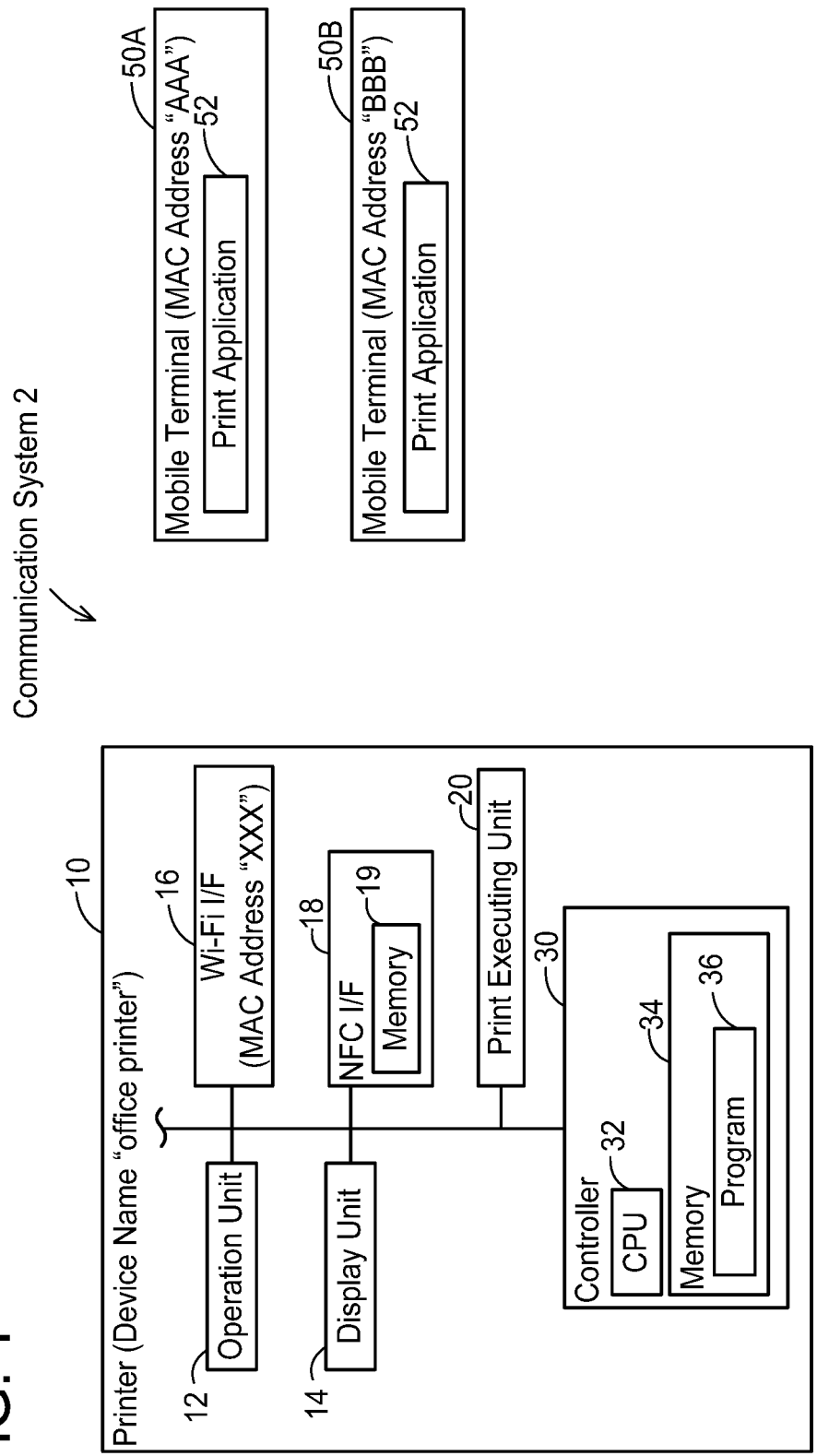
FIG. 1 shows a configuration of a communication system.

First Embodiment (Configuration of Communication System 2; FIG. 1)

As shown in FIG. 1, a communication system 2 includes a printer 10 and a plurality of mobile terminals 50A, 50B. Each of these devices 10, 50A, 50B is capable of executing a wireless communication according to a Wi-Fi scheme (hereinbelow termed "Wi-Fi communication") and a wireless communication according to an NFC (abbreviation of Near Field Communication) scheme (hereinbelow termed "NFC communication"). Especially, each of the devices 10, 50A, 50B is capable of executing (i.e., supporting) a wireless communication according to a WFD (abbreviation of Wi-Fi Direct (registered trademark)) scheme complying with the Wi-Fi scheme (hereinbelow termed "WFD communication").

(Configuration of Printer 10)

The printer 10 is a peripheral device capable of executing a print function (e.g., a peripheral device of the mobile terminal 50A). The printer 10 has a device name "office printer", which is a name of the printer 10. The printer 10 includes an operation unit 12, a display unit 14, a Wi-Fi interface 16, an NFC interface 18, a print executing unit 20, and a controller 30. The respective units 12 to 30 are connected to a bus line (reference sign not given). Hereinbelow, an interface will be denoted "I/F".

The operation unit 12 includes a plurality of keys, and is configured to accept user operations. The display unit 14 is a display for displaying various types of information. The print executing unit 20 includes a print mechanism of an inkjet scheme or a laser scheme.

The Wi-Fi I/F 16 is a wireless interface configured to execute a Wi-Fi communication according to the Wi-Fi scheme. The Wi-Fi I/F 16 is allocated with a MAC address "XXX". The Wi-Fi scheme is a wireless communication scheme for executing a wireless communication according to, for example, IEEE (abbreviation of the Institute of Electrical and Electronics Engineers, Inc.) standard 802.11 and standards complying therewith (e.g., 802.11a, 11b, 11g, 11n). The Wi-Fi I/F 16 especially supports the WFD scheme established by the Wi-Fi Alliance, and is capable of executing a wireless communication according to the WFD scheme. That is, the printer 10 is a WFD device. The WFD scheme is a wireless communication scheme described in the standard document "Wi-Fi Peer-to-Peer (P2P) Technical Specification Version 1.1" created by the Wi-Fi Alliance. In the WFD standard, three states, namely a Group Owner state (hereinbelow termed "G/O state"), a client state, and a device state, are defined as states of WFD devices. WFD devices are capable of selectively operating in one of the aforementioned three states.

Further, the Wi-Fi I/F 16 supports a WPS (abbreviation of Wi-Fi Protected Setup) established by the Wi-Fi Alliance. The WPS is a so-called automatic wireless setting or easy wireless setting, and it is a standard capable of easily establishing a wireless connection between a pair of devices even if wireless setting information (such as a password, an authentication scheme, and an encryption scheme) for establishing the wireless connection according to the Wi-Fi scheme is not inputted by a user. In particular, the Wi-Fi I/F 16 supports a PBC (abbreviation of Push Button Configuration) scheme in the WPS standard. The PBC scheme is a scheme for establishing a wireless connection between a pair of devices in a case where a predetermined operation (such as an operation to press a button) is performed by the user to each of the pair of devices and a PBC mode is thereby enabled.

The NFC I/F 18 is an I/F for executing an NFC communication according to the NFC scheme. The NFC scheme is a wireless communication scheme based on international standards such as ISO/IEC 14443, 15693, and 18092. As types of I/F for executing the NFC communication, an I/F called an NFC forum device (NFC Forum Device) and an I/F called an NFC forum tag are known. In this embodiment, the NFC I/F 18 is an NFC forum tag. Further, the NFC I/F 18 includes a memory 19.

Here, differences between the Wi-Fi communication and the NFC communication will be described. A communication speed of the Wi-Fi communication (e.g., maximum communication speed of 11 to 600 Mbps) is faster than a communication speed of the NFC communication (e.g., maximum communication speed of 100 to 424 Kbps). Further, a carrier wave frequency of the Wi-Fi communication (e.g., 2.4 GHz band or 5.0 GHz band) is different from a carrier wave frequency of the NFC communication (e.g., 13.36 MHz band). Further, a maximum distance with which the Wi-Fi communication can be executed (e.g., about 100 m at maximum) is greater than a maximum distance with which the NFC communication can be executed (e.g., about 10 cm at maximum).

The controller 30 includes a CPU 32 and a memory 34. The CPU 32 executes various processes in accordance with a program 36 stored in the memory 34. The memory 34 is constituted of a volatile memory, a nonvolatile memory, and the like.

(Configurations of Respective Mobile Terminals 50A, 50B)

Each of the mobile terminals 50A, 50B is a mobile terminal device such as a cell phone, a smartphone, a PDA, a laptop PC, a tablet PC, a portable music player, and a portable movie player. Each, of the mobile terminals 50A, 50B includes a Wi-Fi I/F that is not shown, and the Wi-Fi I/Fs of the mobile terminals 50A and 50B are respectively allocated with MAC addresses "AAA" and "BBB".

Further, each of the mobile terminals 50A, 50B stores a print application (hereafter termed "app") 52. This app 52 is an app for causing the printer 10 to execute printing by establishing a wireless connection according to the WFD scheme (hereafter termed "WFD connection") between the printer 10 and the relevant one of the mobile terminals 50A, 50B. The app 52 may be installed in each of the mobile terminals 50A, 50B from a server on the Internet provided by a vendor of the printer 10, or may be installed in each of the mobile terminals 50A, 50B from a medium that is shipped with the printer 10.

Figure 2:
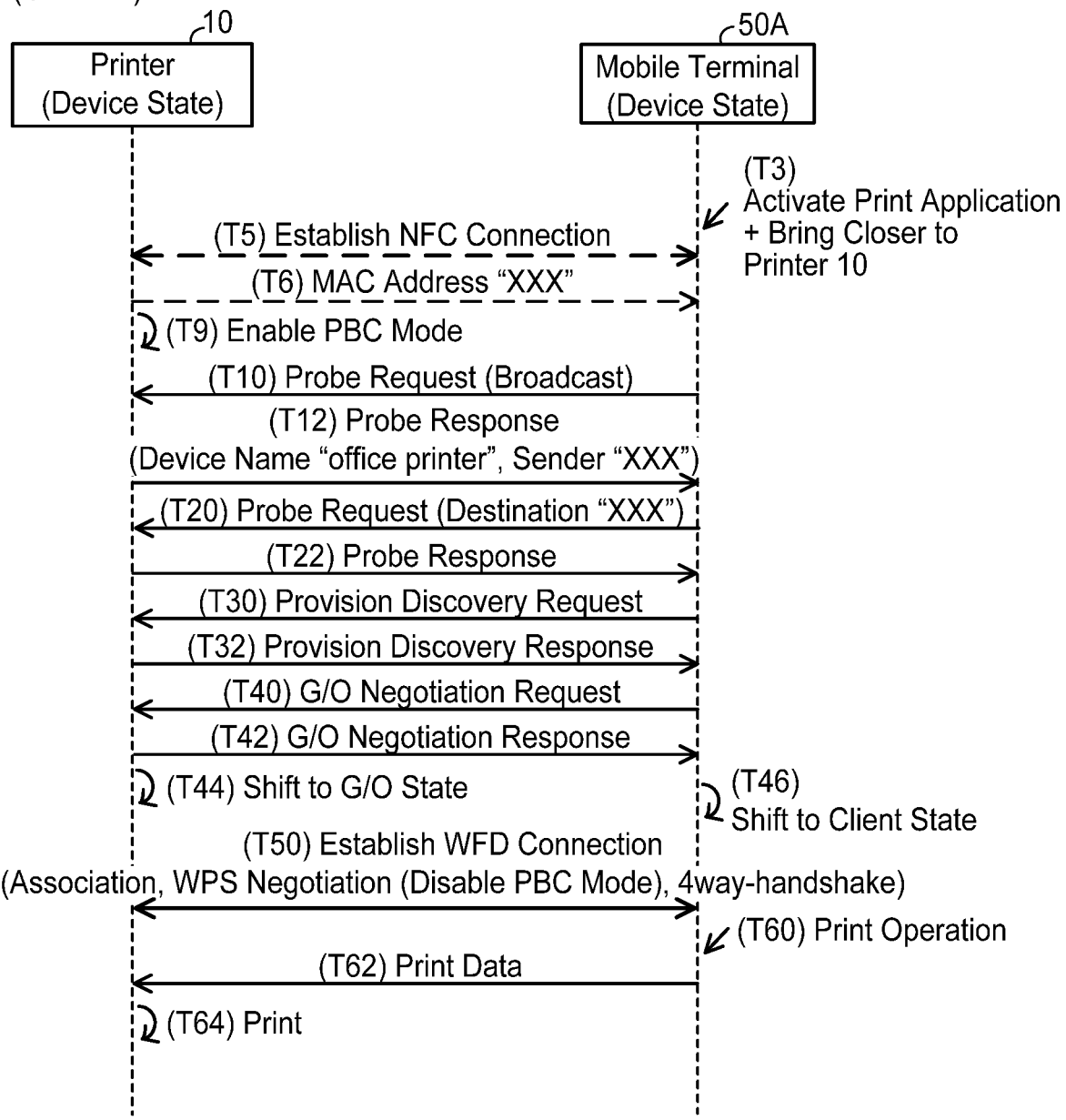
FIG. 2 shows a sequence diagram of Case A1 in which a WFD connection is established after an NFC connection has been established, under a situation where a printer is in a device state.

(Processes by Respective Devices 10, 50A, 50B; FIG. 2, Etc.)

Next, specific examples of processes executed by the respective devices 10, 50A, 50B will be described with reference to FIG. 2 and the subsequent drawings. In FIG. 2, etc., broken line arrows and solid line arrows between the printer 10 (or 100) and the mobile terminals 50A, 50B respectively indicate NFC communications and Wi-Fi communications. Further, the printer 10 executes the NFC communications via the NFC I/F 18 and executes the Wi-Fi communications via the Wi-Fi I/F 16. Thus, hereinbelow, descriptions "via the NFC I/F 18" and "via the Wi-Fi I/F 16" will be omitted.

(Case A1; FIG. 2)

FIG. 2 shows Case A1 in which a WFD connection is established after an NFC connection has been established between the printer 10 and the mobile terminal 50A. Upon when a power of the printer 10 is turned on, the CPU 32 of the printer 10 supplies the MAC address "XXX" to the NFC I/F 18 and causes the MAC address "XXX" to be stored in the memory 19 of the NFC I/F 18. Accordingly, in an initial state of FIG. 2, the MAC address "XXX" is stored in the memory 19. This applies similarly to FIGS. 3, 5 to 8, 10 and 11 to be described later.

In T3, the app 52 in the mobile terminal 50A is activated by a user, and the mobile terminal 50A is brought closer to the printer 10. Due to this, in T5, an NFC connection is established between the printer 10 and the mobile terminal 50A. In this case, in T6, the NFC I/F 18 of the printer 10 uses the NFC connection to send the MAC address "XXX" in the memory 19 to the mobile terminal 50A. Further, in T9, the CPU 32 of the printer 10 enables the PBC mode in response to the NFC connection with the mobile terminal 50A being established. Due to this, the user does not have to perform an operation to enable the PBC mode on the printer 10, so convenience for the user can be improved.

In T10, the CPU 32 receives a Probe request broadcasted from the mobile terminal 50A, and in T12, it sends a Probe response to the mobile terminal 50A. This Probe response includes the device name "office printer" and the MAC address "XXX" of the sender.

In response to sending the Probe request in T10, the mobile terminal 50A receives a Probe response from each of one or more devices including the printer 10. In this case, the mobile terminal 50A can identify the printer 10, which is a connection target, by identifying the Probe response including the MAC address "XXX" that was received in T6 (i.e., the Probe response sent in T12 from the printer 10) from among the one or more Probe responses. Then, in T20, the mobile terminal 50A sends to the printer 10 a Probe request including the MAC address "XXX" of the identified printer 10 as its destination (that is, this Probe request is unicasted).

The CPU 32 receives the Probe request including the MAC address "XXX" from the mobile terminal 50A in T20, and then sends a Probe response to the mobile terminal 50A in T22.

The CPU 32 receives a Provision Discovery request from the mobile terminal 50A in T30, and then sends a Provision Discovery response to the mobile terminal 50A in T32.

In T40, the CPU 32 receives a G/O Negotiation request from the mobile terminal 50A. The G/O Negotiation request is a command for requesting to execute a G/O Negotiation, which is a communication for deciding which one of the printer 10 and the mobile terminal 50A should be a G/O. Then, in T42, the CPU 32 sends a G/O Negotiation response to the mobile terminal 50A to execute the G/O Negotiation with the mobile terminal 50A. In the present case, it is decided that the printer 10 becomes the G/O and the mobile terminal 50A becomes a client. The printer 10 shifts to the G/O state in T44 and the mobile terminal 50A shifts to the client state in T46.

In T50, the CPU 32 executes various types of communications with the mobile terminal 50A (Association, WPS Negotiation, 4way-handshake, etc.). In the WPS Negotiation, the CPU 32 sends to the mobile terminal 50A wireless setting information including an SSID and a password to be used in a wireless network in which the printer 10 operates as the G/O. Further, the CPU 32 disables the PBC mode in the course of the WPS Negotiation. Due to this, even if the CPU 32 receives a request (such as an Associate request) according to the PBC mode from another mobile terminal (such as 50B), the CPU 32 does not send a response to this request to the other mobile terminal, and thus does not establish a WFD connection with the other mobile terminal. Further, the CPU 32 receives an SSID and a password from the mobile terminal 50A in the course of the 4way-handshake communication, and establishes a WFD connection with the mobile terminal 50A in a case where authentication of this SSID and this password succeeds.

In response to a print operation for causing the printer 10 to execute printing being performed on the mobile terminal 50A in T60, the CPU 32 receives print data from the mobile terminal 50A in T62 by using the WFD connection, and causes the print executing unit 20 to execute printing according to the print data in T64.

As above, in this embodiment, the WFD connection is established after the NFC connection has been established between the printer 10 and the mobile terminal 50A, and the print data is communicated by using the WFD connection. A communication speed using the WFD connection (i.e., the communication speed of the Wi-Fi communication) is faster than the communication speed using the NFC communication. Due to this, the print data can be communicated at faster speed than in a case of communicating the print data using the NFC communication. Further, the user simply needs to perform the operation to activate the app 52 and the operation to bring the mobile terminal 50A close to the printer 10 in order to establish the WFD connection between the printer 10 and the mobile terminal 50A. Due to this, the user can easily establish the WFD connection.

Figure 3:
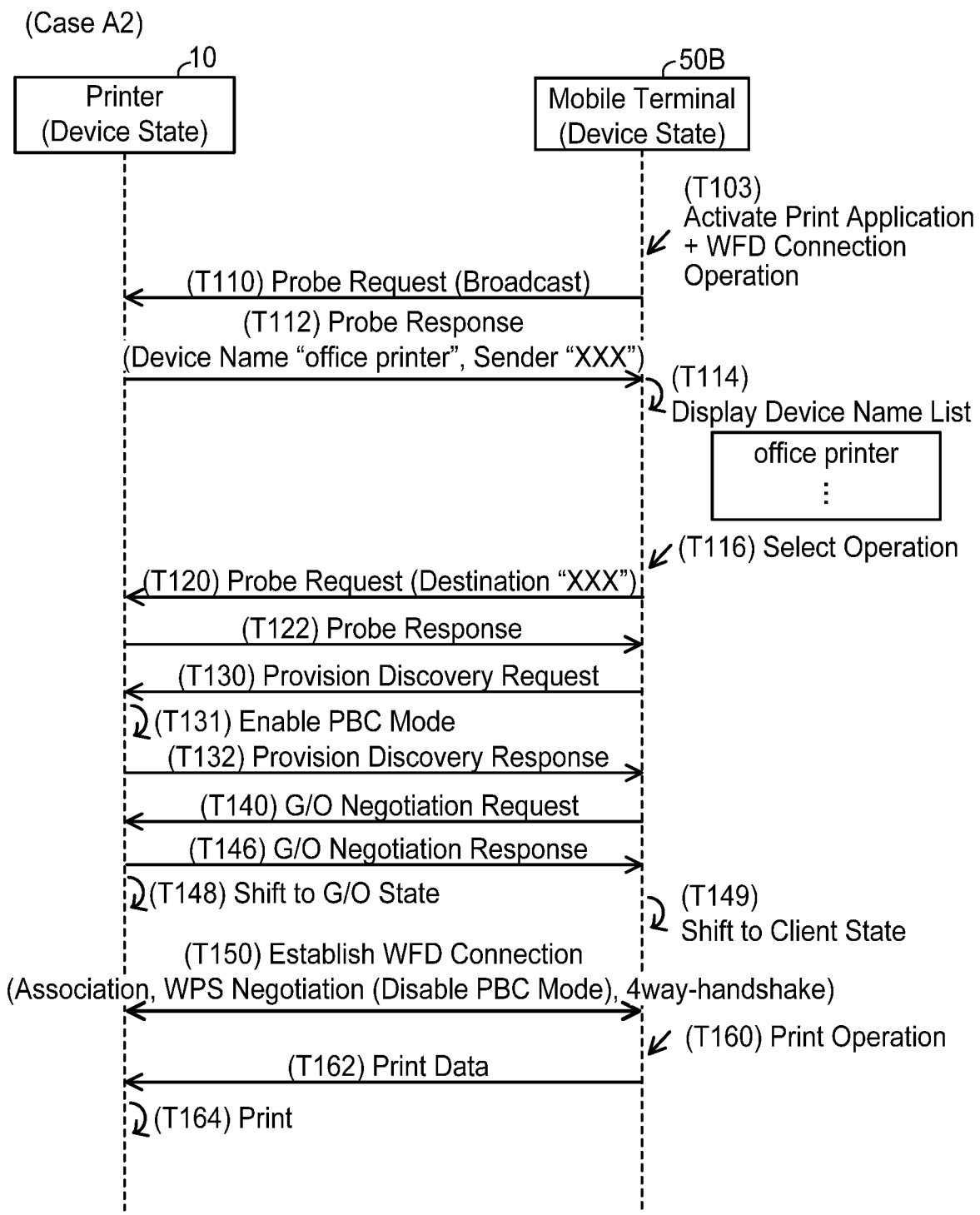
FIG. 3 shows a sequence diagram of Case A2 in which a WFD connection is established without establishing an NFC connection, under the situation where the printer is in the device state.

(Case A2; FIG. 3)

Next, Case A2 in which a WFD connection is established between the printer 10 and the mobile terminal 50B without establishing an NFC connection therebetween will be described with reference to FIG. 3. In T103, the app 52 in the mobile terminal 50B is activated by the user, and a WFD connection operation is performed on the mobile terminal 50B. Due to this, in T110, the CPU 32 of the printer 10 receives a Probe request broadcasted from the mobile terminal 50B. T110 and T112 are the same as T10 and T12 of FIG. 2 except that the communication target is the mobile terminal 50B.

In response to sending the Probe request in T110, the mobile terminal 50B receives a Probe response from each of one or more devices including the printer 10. However, since the mobile terminal 50B does not receive the MAC address "XXX" from the printer 10 by using an NFC connection, it cannot identify the Probe response including the MAC address "XXX" from among the one or more received Probe responses (that is, the printer 10, which is the connection target, cannot be identified). Due to this, in T114, the mobile terminal 50B displays a device name list that indicates one or more device names included in the one or more received Probe responses. Then, in T116, the device name "office printer" of the printer 10 is selected by the user from the device name list. In this case, in T120, the mobile terminal 50B identifies the MAC address "XXX" included in the Probe response of T112 including the selected device name "office printer" (that is, the printer 10, which is the connection target, is identified), and sends a Probe request including the identified MAC address "XXX" as its destination to the printer 10. T122 is the same as T22 of FIG. 2 except that the communication target is the mobile terminal 50B.

In response to receiving a Provision Discovery request from the mobile terminal 50B in T130, the CPU 32 enables the PBC mode in T131, and sends a Provision Discovery response to the mobile terminal 50B in T132.

The CPU 32 receives a G/O Negotiation request from the mobile terminal 50B in T140, sends a G/O Negotiation response to the mobile terminal 50B in T146 to execute the G/O Negotiation with the mobile terminal 50B. In the present case, the printer 10 shifts to the G/O state in T148, and the mobile terminal 50B shifts to the client state in T149. T150 to T164 are the same as T50 to T64 of FIG. 2 except that the communication target is the mobile terminal 50B.

Figure 4:
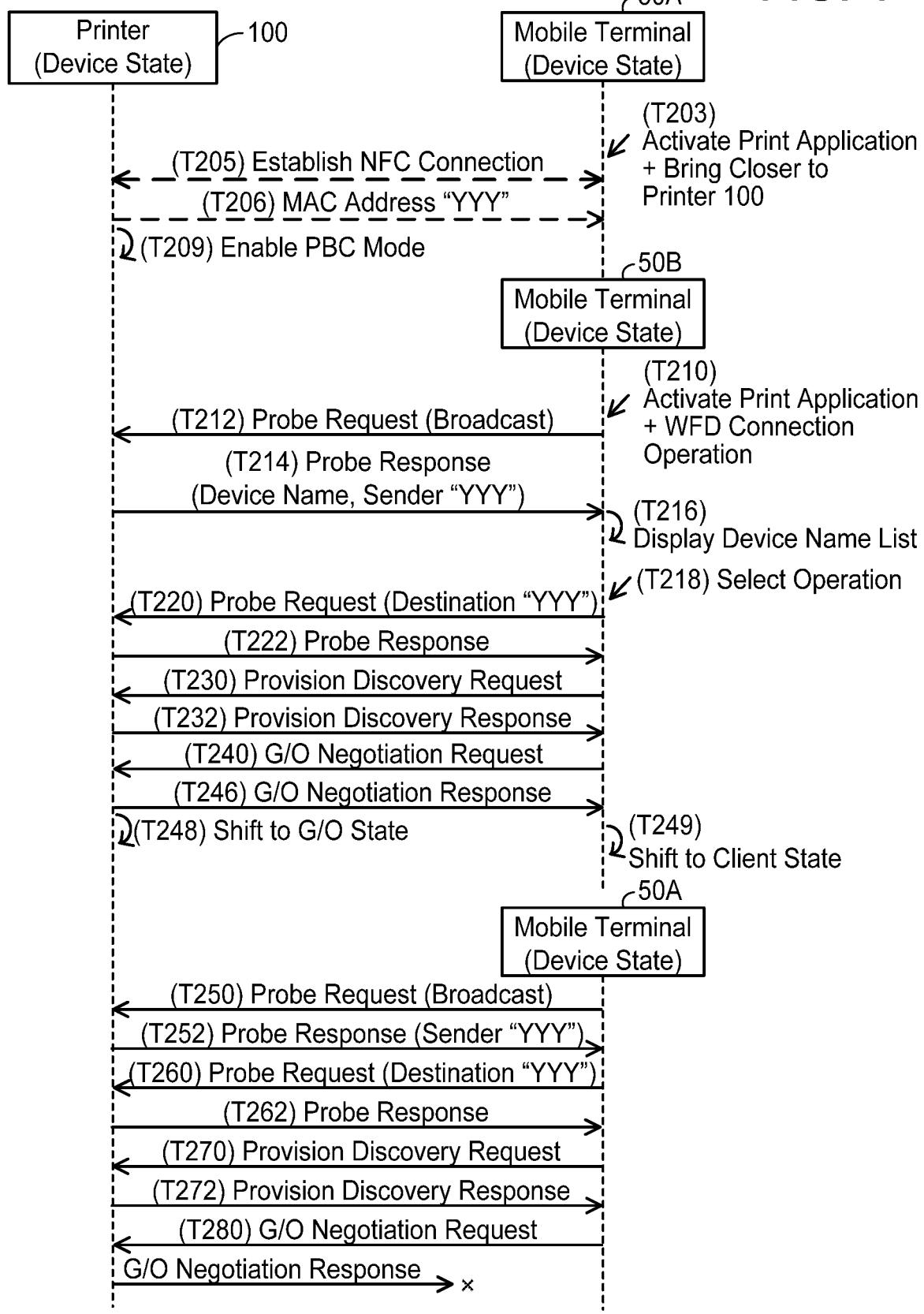
FIG. 4 shows a sequence diagram of a first comparative example.

As shown in Cases A1 and A2 of FIGS. 2 and 3, the printer 10 can establish the WFD connection with the respective mobile terminals 50A, 50B. Here, a situation will be assumed in which, after the PBC mode has been enabled in the printer 10 in response to the NFC connection with the mobile terminal 50A having been established (i.e., after T9 of FIG. 2), the WFD connection operation is performed on the mobile terminal 50B which is different from the mobile terminal 50A. In this case, in a conventional printer, there had been a possibility that the WFD connection with the mobile terminal 50A, with which the NFC connection has been established, could not have suitably been established. With reference to FIG. 4, a first comparative example of an operation of such a conventional printer 100 will be described.

First Comparative Example; FIG. 4

T203 and T205 are the same as T3 and T5 of FIG. 2 except that the printer 100 of the first comparative example is used. The printer 100 uses the NFC connection to send a MAC address "YYY" of the printer 100 to the mobile terminal 50A in T206, and enables the PBC mode in T209.

Subsequent T210 and T212 are the same as T103 and T110 of FIG. 3 except that the printer 100 is used. In T214, the printer 100 sends to the mobile terminal 50B a Probe response including a device name of the printer 100 and the MAC address "YYY" of the sender.

Subsequent T216 to T246 are the same as T114 to T130 and T132 to T146 of FIG. 3 except that the printer 100 of the first comparative example is used. As a result, the printer 100 shifts to the G/O state in T248 and the mobile terminal 50B shifts to the client state in T249.

As aforementioned, despite the NFC connection having been established between the printer 100 and the mobile terminal 50A, the G/O Negotiation is executed between the printer 100 and the mobile terminal 50B which is different from the mobile terminal 50A and the printer 100 shifts to the G/O state. Further, after this, T250 to T272 are executed between the printer 100 and the mobile terminal 50A. T250 to T272 are the same as T10 to T32 of FIG. 2 except that the printer 100 is used. Next, in T280, the printer 100 receives a G/O Negotiation request from the mobile terminal 50A. However, since the printer 100 already has shifted to the G/O state (T248), the G/O Negotiation with the mobile terminal 50A cannot be executed. Thus, the printer 100 does not send a G/O Negotiation response to the mobile terminal 50A, as a result of which the WFD connection with the mobile terminal 50A cannot be established.

As shown in the first comparative example, there is the possibility that the conventional printer 100 cannot establish the WFD connection with the mobile terminal 50A with which the NFC connection has been established. Contrary to this, the printer 10 of the embodiment can suitably establish the WFD connection with the mobile terminal 50A with which the NFC connection has been established by executing processes of FIGS. 5 and 6 described below.

Figure 5:
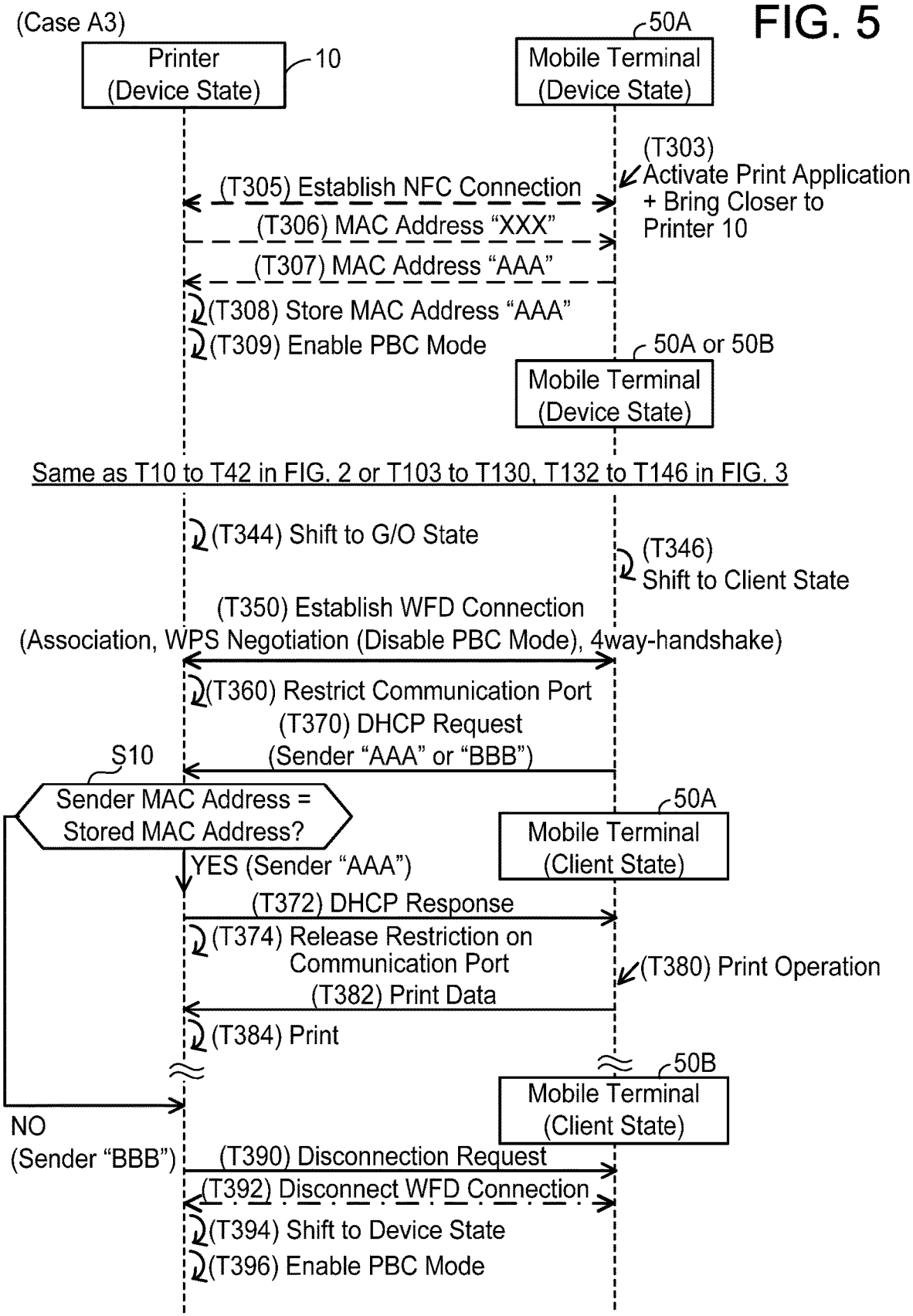
FIG. 5 shows a sequence diagram of Case A3 in which whether MAC addresses are identical to each other is determined after the printer has shifted to a G/O state.

(Case A3; FIG. 5)

Case A3 in which a WFD connection between the printer 10 and the mobile terminal 50A is suitably established after the printer 10 has shifted to the G/O state will be described with reference to FIG. 5. T303 to T306 are the same as T3 to T6 of FIG. 2. In T307, the CPU 32 uses the NFC connection to receive the MAC address "AAA" of the mobile terminal 50A from the mobile terminal 50A, and stores the MAC address "AAA" in the memory 34 in T308. T309 is the same as T9 of FIG. 2.

Hereinbelow, a situation in which the printer 10 executes communication with one of the mobile terminal 50A and the mobile terminal 50B will be assumed. A mobile terminal which is a target of the communication will be termed "target mobile terminal". In a case where the target mobile terminal is the mobile terminal 50A, processes same as those of T10 to T42 of FIG. 2 are executed, and in a case where the target mobile terminal is the mobile terminal 50B, processes same as those of T103 to T130 and T132 to T146 of FIG. 3 are executed. In the present case, the printer 10 shifts to the G/O state in T344, and the target mobile terminal shifts to the client state in T346. T350 is the same as T50 of FIG. 2.

In T360, the CPU 32 restricts communication port for communication via the Wi-Fi I/F 16. Specifically, the CPU 32 opens (i.e. enables) only a communication port having a port number (such as "67", "68") used in a communication, according to a DHCP (abbreviation of Dynamic Host Configuration Protocol), and closes (i.e. disables) communication ports having port numbers used in communications according to the other protocols. Due to this, for example, even if the target mobile terminal is the mobile terminal 50B and print data is sent from the mobile terminal 50B to the printer 10 by using the WFD connection, the print data is not received by the printer 10. Thus, even if the WFD connection is established with the mobile terminal 50B which is different from the mobile terminal 50A with which the NFC connection has been established, the communication using the WFD connection can be restricted.

In T370, the CPU 32 receives a DHCP request that requests allocation of an IP address from the target mobile terminal by using the WFD connection established in T350. This DHCP request includes the MAC address of the sender (i.e., "AAA" or "BBB").

In S10, the CPU 32 determines whether or not the MAC address of the sender in the DHCP request and the MAC address "AAA" stored in the memory 34 in T308 are identical to each other. In a case of determining that the MAC address of the sender and the stored MAC address "AAA" are identical, that is, in the case where the target mobile terminal is the mobile terminal 50A (YES in S10), the CPU 32 sends a DHCP response to the mobile terminal 50A in T372. This DHCP response includes an IP address (not shown) to be used by the target mobile terminal. Next, in T374, the CPU 32 opens the respective communication ports that were closed in T360. As a result, in response to the print operation being performed on the mobile terminal 50A (T380), the CPU 32 can receive print data from the mobile terminal 50A by using the WFD connection (T382) and can cause the print executing unit 20 to execute printing according to the print data (T384).

On the other hand, in a case of determining that the MAC address of the sender and the stored MAC address "AAA" are not identical, that is, in the case where the mobile terminal 50A is not the target mobile terminal (i.e., the mobile terminal 50B) (NO in S10), the CPU 32 sends a disconnection request that requests to disconnect the WFD connection to the mobile terminal 50B in T390, and then disconnects the WFD connection with the mobile terminal 50B in T392.

The CPU 32 shifts from the G/O state to the device state in T394, and enables the PBC mode again in T396. Due to this, the CPU 32 can thereafter execute the communications of T10 to T42 of FIG. 2 and T344 to T384 of FIG. 5 with the mobile terminal 50A. That is, the CPU 32 can suitably establish a WFD connection with the mobile terminal 50A, as a result of which it can receive the print data from the mobile terminal 50A by using the WFD connection and cause the print executing unit 20 to execute printing according to the print data.

As above, in the case of establishing the NFC connection with the mobile terminal 50A (T305), the printer 10 receives the MAC address "AAA" of the mobile terminal 50A from the mobile terminal 50A (T307). After this, the printer 10 receives the DHCP request including the MAC address of the sender from the target mobile terminal (T370) after the WFD connection has been established with the target mobile terminal (i.e., the mobile terminal 50A or the mobile terminal 50B) (T350). In this case, the printer 10 determines whether or not the mobile terminal 50A is the target mobile terminal by using the stored MAC address "AAA" and the MAC address of the sender (S10). In the case of determining that the mobile terminal 50A is not the target mobile terminal (NO in S10), that is, in the case where the target mobile terminal is the mobile terminal 50B which is different from the mobile terminal 50A, the printer 10 disconnects the WFD connection with the mobile terminal 50B (T392). As above, since the WFD connection with the mobile terminal 50B which is different from the mobile terminal 50A is disconnected, the printer 10 can suitably establish the WFD connection with the mobile terminal 50A after the disconnection.

Further, as above, in the case of establishing the WFD connection with the target mobile terminal (T350), the printer 10 restricts the communication port for communication via the Wi-Fi I/F 16 (T360). Here, a comparative example in which the communication port is not restricted will be considered. In the comparative example, for example, in a case of establishing a WFD connection with an illegitimate mobile terminal which is different from the mobile terminal 50A, a printer may execute communication of print data with this mobile terminal by using the WFD connection. Contrary to this, in the present embodiment, the printer 10 restricts the communication port, so it does not execute communication of the print data by using the WFD connection with the illegitimate mobile terminal which is different from the mobile terminal 50A. Thus, the communication of the print data with the illegitimate mobile terminal can be prevented from being executed.

(Case A4: FIG. 6)

Next, Case A4 in which a WFD connection is suitably established between the printer 10 and the mobile terminal 50A after the printer 10 has shifted to the client state will be described with reference to FIG. 6. T403 to T406 are the same as T3 to T6 of FIG. 2. The CPU 32 uses the NFC connection to receive the MAC address "AAA." of the mobile terminal 50A from the mobile terminal 50A in T407, and stores the MAC address "AAA" in the memory 34 in T408. T409 is the same as T9 of FIG. 2.

Next, the printer 10 executes a communication with the target mobile terminal (i.e., the mobile terminal 50A or the mobile terminal 50B). In a case where the target mobile terminal is the mobile terminal 50A, processes same as those of T10 to T42 of FIG. 2 are executed, and in a case where the target mobile terminal is the mobile terminal 50B, processes same as those of T103 to T130 and T132 to T146 of FIG. 3 are executed. In the present case, the printer 10 shifts to the client state in T444 and the target mobile terminal shifts to the G/O state in T446. T450 and T460 are the same as T350 and T360 of FIG. 5. However, in T450, the CPU 32 receives wireless setting information including an SSID and a password from the target mobile terminal in the WPS Negotiation, sends an SSID and a password to the target mobile terminal in the course of communication in 4way-handshake, and establishes a WFD connection with the target mobile terminal in a case where authentication of the SSID and the password succeeds in the target mobile terminal.

Next, the CPU 32 sends a DHCP request that requests allocation of an IP address to the target mobile terminal by using the WFD connection in T470, and receives a DHCP response including the MAC address of the sender and an IP address (not shown) to be used by the printer 10 in T472.

In S20, the CPU 32 determines whether or not the MAC address of the sender in the DHCP response and the stored MAC address "AAA" are identical to each other. In a case where the MAC address of the sender and the stored MAC address "AAA" are identical, that is, in the case where the target mobile terminal is the mobile terminal 50A (YES in S20), the CPU 32 opens, in T474, the respective communication ports that were closed in T460. T480 to T484 that follows thereafter are the same as T380 to T384 of FIG. 5.

On the other hand, in a case where the MAC address of the sender and the stored MAC address "AAA" are not identical, that is, in the case where the target mobile terminal (the mobile terminal 50B) is not the mobile terminal 50A (NO in S20), the CPU 32 sends a disconnection request that requests to disconnect the WFD connection to the mobile terminal 50B in T490, and then disconnects the WFD connection with the mobile terminal 50B in T492. T494 and T496 are the same as T394 and T396 of FIG. 5.

As above, in the case of establishing the NFC connection with the mobile terminal 50A (T405), the printer 10 receives the MAC address "AAA" of the mobile terminal 50A from the mobile terminal 50A (T407). After this, the printer 10 sends the DHCP request to the target mobile terminal (T470) after having established the WFD connection with the target mobile terminal (T450), and receives the DHCP response including the MAC address of the sender from the target mobile terminal (T472). In this case, the printer 10 determines whether or not the mobile terminal 50A is the target mobile terminal (S20) by using the stored MAC address "AAA" and the MAC address of the sender. In the case where the mobile terminal 50A is not the target mobile terminal (NO in S20), that is, in the case where the target mobile terminal is the mobile terminal 50B, the printer 10 disconnects the WFD connection with the mobile terminal 50B (T492). As above, since the WFD connection with the mobile terminal 50B which is different from the mobile terminal 50A is disconnected, the printer 10 can thereafter suitably establish the WFD connection with the mobile terminal 50A.

Figure 7:
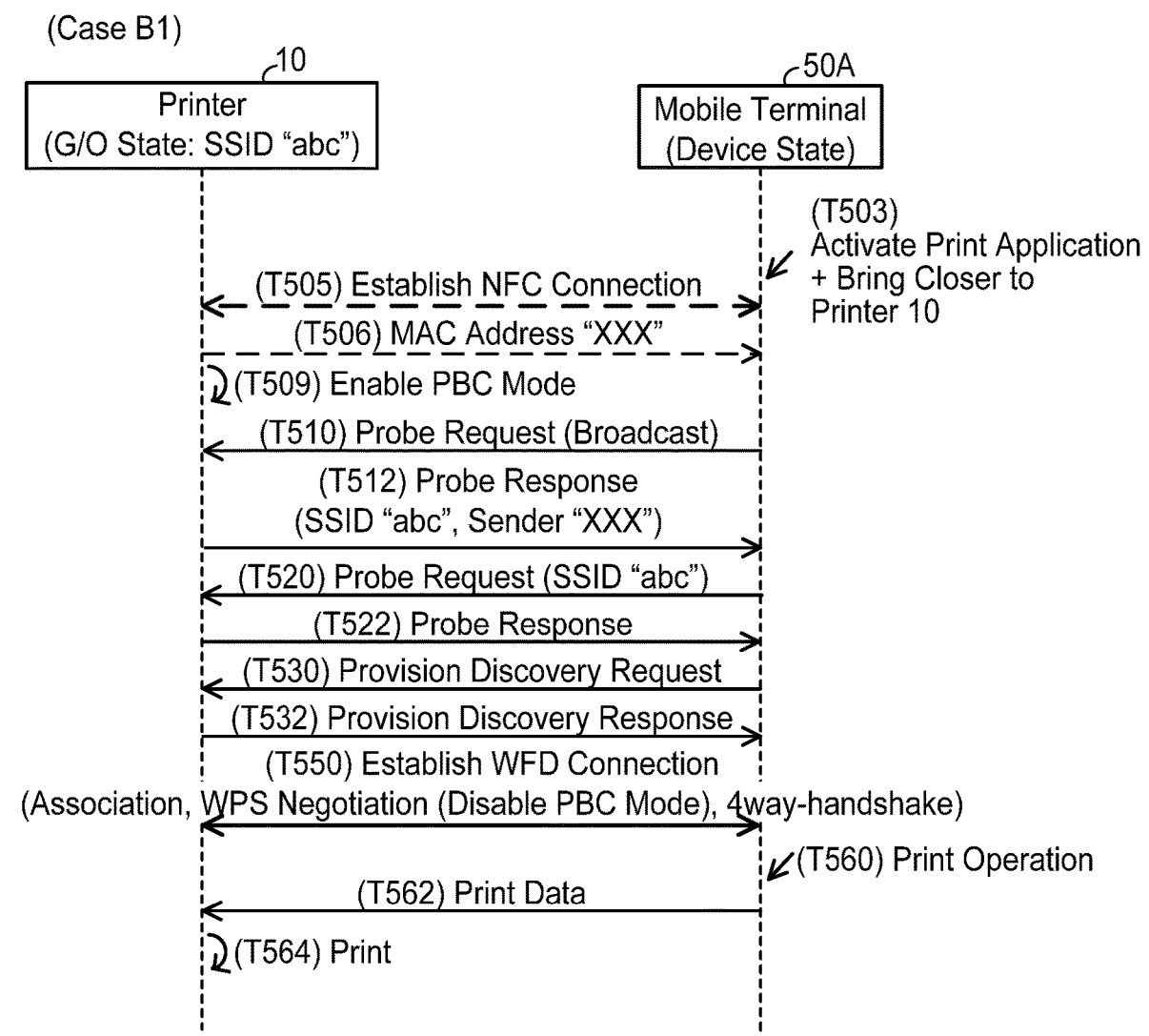
FIG. 7 shows a sequence diagram of Case B1 in which a WFD connection is established after an NFC connection has been established, under a situation where the printer is in the G/O state.

(Case B1; FIG. 7)

Next, Case B1 in which a WFD connection is established after an NFC connection has been established between the printer 10 and the mobile terminal 50A, in the state where the printer 10 is in the G/O state will be described with reference to FIG. 7. For example, when the printer 10 shifts to the G/O state as a result of the printer 10 having executed the G/O Negotiation with a mobile terminal (not shown) which is different from each of the mobile terminals 50A, 50B, an initial state of this Case B1 is realized. Further, for example, when an operation to actively bring the printer 10 to the G/O state is performed on the printer 10 by the user, the initial state of this Case B1 is realized.

T503 to T510 are the same as T3 to T10 of FIG. 2 except that the printer 10 is in the G/O state. The CPU 32 of the printer 10 sends a Probe response to the mobile terminal 50A in T512. This Probe response includes an SSID "abc" used in a wireless network in which the printer 10 operates as the G/O and the MAC address "XXX" of the sender.

In response to sending the Probe request in T510, the mobile terminal 50A receives a Probe response from each of one or more devices including the printer 10. The mobile terminal 50A identifies the Probe response including the MAC address "XXX" received in T506 from among the one or more Probe responses, and sends to the printer 10 a Probe request including the SSID "abc" included in the identified Probe response as the destination in T520.

T522 to T532 are the same as T22 to T32 of FIG. 2 except that the printer 10 is in the G/O state and the Probe request of T520 includes the SSID "abc". In the present case, since the printer 10 is already operating in the G/O state, the CPU 32 executes the various communications with the mobile terminal 50A without receiving a G/O Negotiation request from the mobile terminal 50A and establishes a WFD connection with the mobile terminal 50A in T550. T560 to T564 are the same as T60 to T64 of FIG. 2.

Figure 8:
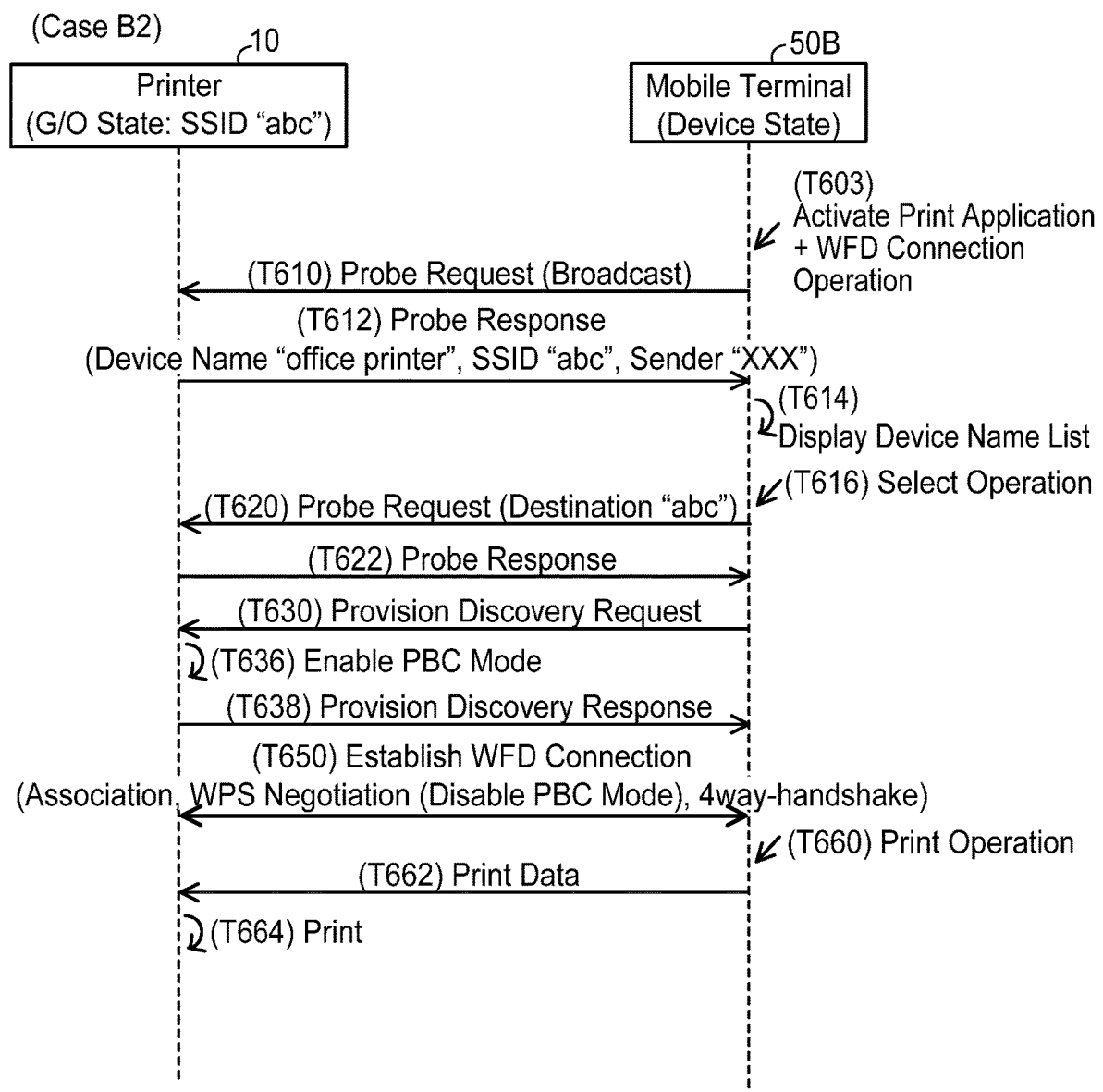
FIG. 8 shows a sequence diagram of Case B2 in which a WFD connection is established without establishing an NFC connection, under the situation where the printer is in the G/O state.

(Case B2; FIG. 8)

Next, Case B2 in which a WFD connection is established without an NFC connection being established between the printer 10 and the mobile terminal 50B, in the state where the printer 10 is in the G/O state will be described with reference to FIG. 8. T603 and T610 are the same as T103 and T110 of FIG. 3. In T612, the CPU 32 of the printer 10 sends a Probe response including the device name "office printer", the SSID "abc", and the MAC address "XXX" of the printer 10 to the mobile terminal 50B.

T614 and T616 are the same as T114 and T116 of FIG. 3. In this case, in T620, the mobile terminal 50B identifies the SSID "abc" included in the Probe response of T612 including the selected device name "office printer" (i.e., identifies the printer 10 being the connection target), and sends a Probe request including the identified SSID "abc" as the destination to the printer 10. T622 and T630 are the same as T122 and T130 of FIG. 3.

In response to receiving a Provision Discovery request in T630 from the mobile terminal 50B. The CPU 32 enables the PBC mode in T636 and sends a Provision Discovery response to the mobile terminal 50B in T638. T650 to T664 are the same as T150 to T164 of FIG. 3.

As shown in Cases B1 and B2 of FIGS. 7 and 8, the printer 10 can establish the WFD connections with the respective mobile terminals 50A, 50B. Here, in the printer 10, a situation will be assumed in which, after the PBC mode has been enabled in response to the NFC connection having been established with the mobile terminal 50A (i.e., after T509 of FIG. 7), the WFD connection operation is performed on the mobile terminal 50B which is different from the mobile terminal 50A. In this case, in a conventional printer, there had been a possibility that a WFD connection with the mobile terminal 50A with which an NFC connection has been established could not suitably be established. A second comparative example indicating an operation of such conventional printer 100 will be described with reference to FIG. 9.

Figure 9:
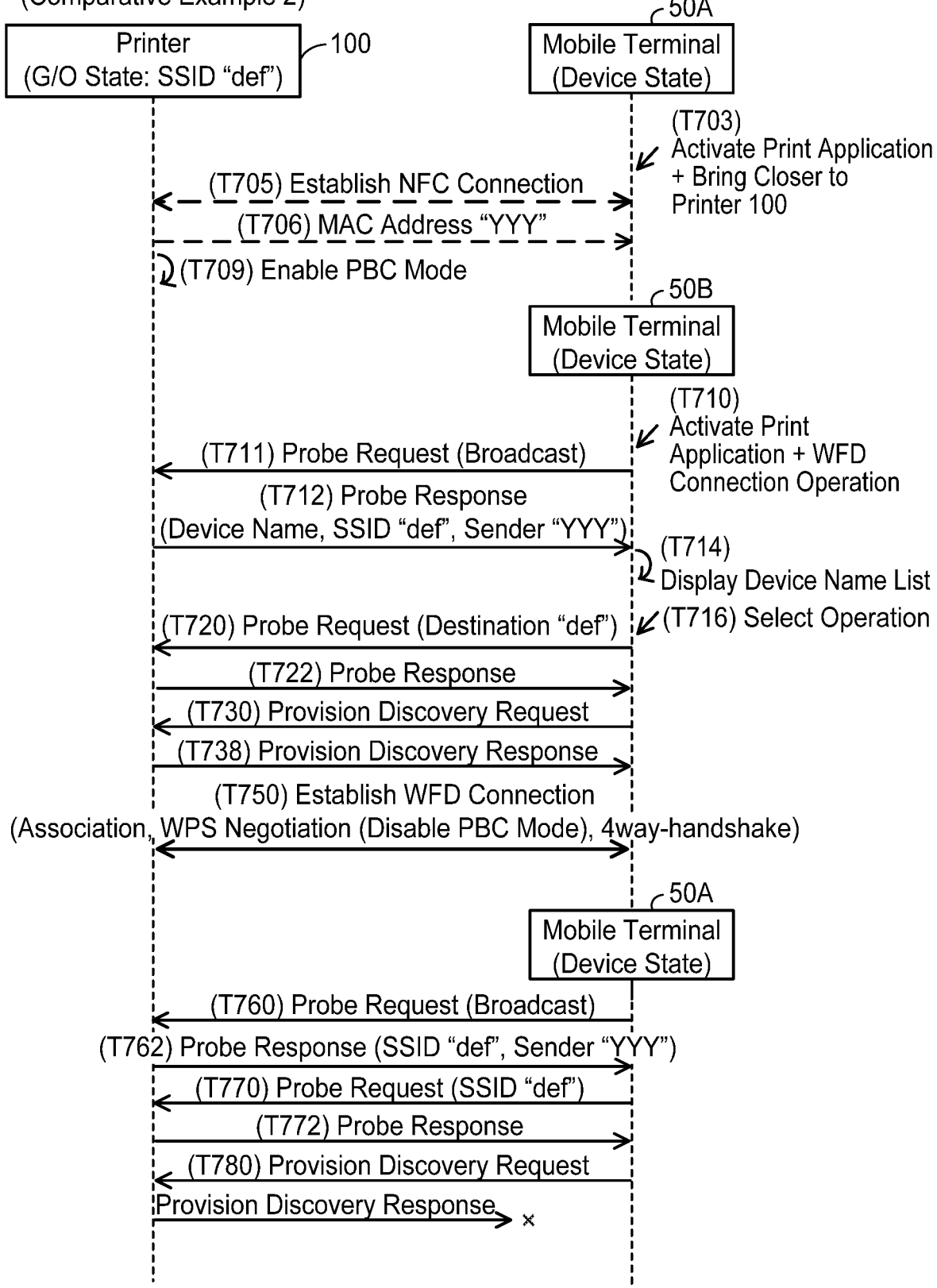
FIG. 9 shows a sequence diagram of a second comparative example.

Second Comparative Example; FIG. 9

T703 to T711 are the same as T203 to T212 of FIG. 4 except that the printer 100 is in the G/O state. In T712, the printer 100 sends to the mobile terminal 50B a Probe response including the device name of the printer 100, an SSID "def" of a wireless network in which the printer 100 operates as the G/O, and the MAC address "YYY" of the sender. Subsequent T714 to T750 are the same as T614 to T650 of FIG. 8 except that the printer 100 is used.

As aforementioned, despite the NFC connection having been established between the printer 100 and the mobile terminal 50A, the WPS Negotiation is executed between the printer 100 and the mobile terminal 50B which is different from the mobile terminal 50A and the PBC mode is disabled in the course of the negotiation (T750). Further, after this, T760 to T780 are executed between the printer 100 and the mobile terminal 50A. T760 to T780 are the same as T510 to T530 of FIG. 7. However, since the printer 100 has disabled the PBC mode (T750), it cannot execute a communication according to the PBC mode with the mobile terminal 50A. Thus, the printer 100 does not send a Provision Discovery response to the mobile terminal 50A, as a result of which a WFD connection with the mobile terminal 50A cannot be established.

As shown in the second comparative example, the conventional printer 100 has the possibility of not being able to establish the WFD connection with the mobile terminal 50A with which the NFC connection bad been established. Contrary to this, the printer 10 of the present embodiment can suitably establish the WFD connection with the mobile terminal 50A with which the NFC connection had been established by executing processes of FIG. 10 described below.

Figure 10:
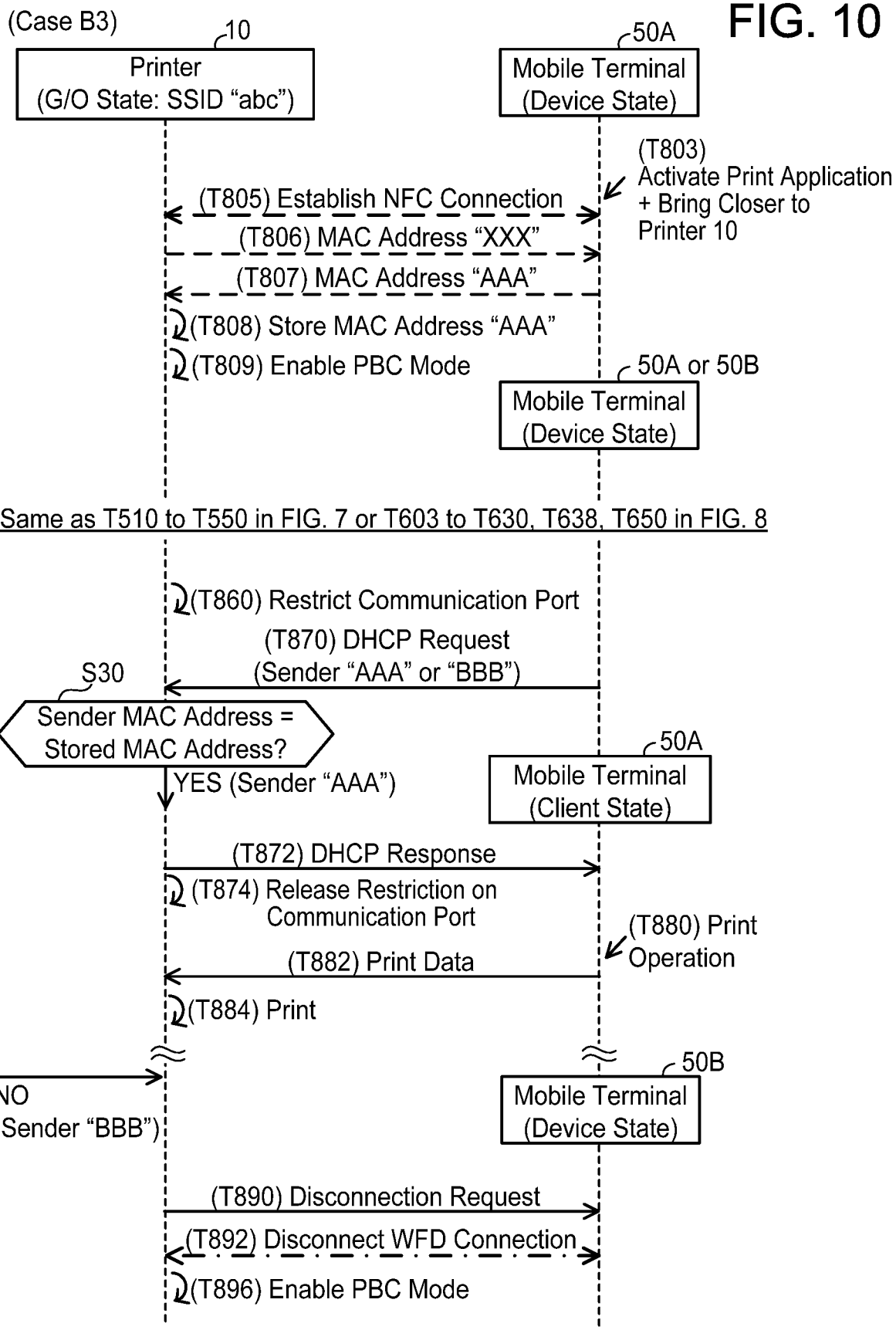
FIG. 10 shows a sequence diagram of Case B3 in which whether MAC addresses are identical to each other is determined under the situation where the printer is in the G/O state.

(Case B3; FIG. 10)

Case B3 in which a WFD connection is suitably established between the printer 10 and the mobile terminal 50A will be described with reference to FIG. 10. T803 to T809 are the same as T303 to T309 of FIG. 5 except that the printer 10 is in the G/O state.

Next, the CPU 32 executes a communication with the target mobile terminal (i.e., the mobile terminal 50A or the mobile terminal 50B). In the case where the target mobile terminal is the mobile terminal 50A, processes same as those of T510 to T550 of FIG. 7 are executed, and in the case where the target mobile terminal is the mobile terminal 50B, processes same as those of T603 to T630, T638, and T650 of FIG. 8 are executed. After this, the CPU 32 restricts the communication port for communication via the Wi-Fi I/F 16 in T860, and receives a DHCP request including the MAC address of the sender in T870 from the target mobile terminal.

S30 is the same as S10 of FIG. 5. In the case of determining that the MAC address of the sender and the stored MAC address "AAA" are identical, that is, in the case of determining that the mobile terminal 50A is the target mobile terminal (YES in S30), the CPU 32 sends a DHCP response to the mobile terminal 50A in T872 and opens in T874 the respective communication ports that were closed in T860. As a result, in response to the print operation being performed on the mobile terminal 50A (T880), the CPU 32 can receive print data from the mobile terminal 50A by using the WFD connection (T882), and cause the print executing unit 20 to execute printing in accordance with the print data (T884).

On the other hand, in the case of determining that the MAC address of the sender and the stored MAC address "AAA" are not identical, that is, in the case where the target mobile terminal (i.e., the mobile terminal 50B) is not the mobile terminal 50A (NO in S30), the CPU 32 sends a disconnection request that requests to disconnect the WFD connection to the mobile terminal 50B in T890, and then disconnects the WFD connection with the mobile terminal 50B in T892. Then, the CPU 32 enables the PBC mode in T896. In the present case as well, since the WFD connection with the mobile terminal 50B which is different from the mobile terminal 50A is disconnected, the printer 10 can thereafter suitably establish the WFD connection with the mobile terminal 50A.

(Corresponding Relationships)

The printer 10, the mobile terminal 50A, and the target mobile terminal are respectively examples of "communication device", "first terminal device", and "second terminal device". The NFC I/F 18 and the Wi-Fi I/F 16 are respectively examples of "first wireless interface" and "second wireless interface". The NFC connection with the mobile terminal 50A and the WFD connection with the target mobile terminal are respectively examples of "first wireless connection" and "second wireless connection". The MAC address "AAA" is an example of "first specific information". The MAC address in the DHCP request of T370 of FIG. 5 and T870 of FIG. 10 and the MAC address in the DHCP response of T472 of FIG. 6 are examples of "second specific information". The DHCP request of T370 and T870 and the DHCP request of T470 are respectively examples of "first request" and "second request".

The process of T307 of FIG. 5 (and T407 of FIG. 6, T807 of FIG. 10) and the process of T350 (and T450, T850) are respectively examples of "receive first specific information" and "establish a second wireless connection". The process of T370 (and T472, T870) is an example of "receive second specific information". The processes of S10 of FIG. 5, S20 of FIG. 6, S30 of FIG. 10 are examples of "determine whether the first terminal device is identical to the second terminal device". T T390, T490, and T890 are examples of "disconnecting the second wireless connection".

Second Embodiment; FIG. 11

Next, a second embodiment will be described with reference to FIG. 11. In the second embodiment, each of the mobile terminals 50A, 50B stores an encryption key and a decryption key. The encryption key and the decryption key of the mobile terminal 50A differ from the encryption key and the decryption key of the mobile terminal 50B.

T903 to T906 of FIG. 11 are the same as T3 to T6 of FIG. 2. The CPU 32 of the printer 10 uses the NFC connection to receive the encryption key from the mobile terminal 50A in T907, and stores the encryption key in the memory 34 in T908. T909 is the same as T9 of FIG. 2.

Next, the printer 10 executes communication with the target mobile terminal (i.e., the mobile terminal 50A or the mobile terminal 50B). In the case where the target mobile terminal is the mobile terminal 50A, processes same as those of T10 to T42 of FIG. 2 are executed, and in the case where the target mobile terminal is the mobile terminal 50B, processes same as those of T103 to T130 and T132 to T146 of FIG. 3 are executed. As a result, the printer 10 shifts to the G/O state in T944 and the target mobile terminal shifts to the client state in T946. T950 and T960 are the same as T350 and T360 of FIG. 5. However, in T960, a port used for communicating a Challenge request and a Challenge response (to be described later) is not closed.

The CPU 32 uses the encryption key stored in T908 to encrypt target data and generate encrypted data in T962, and uses the WFD connection to send a Challenge request including the encrypted data to the mobile terminal 50A in T970. The Challenge request is a command requesting the target mobile terminal to send decrypted data to the printer 10.

In response to receiving the Challenge request from the printer 10 in T970, the target mobile terminal decrypts the encrypted data in the Challenge request by using the decryption key and generates decrypted data in T972, and sends a Challenge response including the decrypted data to the printer 10 in T374.

In response to receiving the Challenge response from the target mobile terminal in T974, the CPU 32 determines in S40 whether or not the target data and the decrypted data in the Challenge response are identical to each other. In a case of determining that the target data and the decrypted data are identical, that is, in the case of determining that the mobile terminal 50A is the target mobile terminal (YES in S40, the CPU 32 opens in T978 the respective communication ports that were closed in T960. T980 to T984 that follows thereafter are the same as T380 to T384 of FIG. 5.

On the other hand, in a case of determining that the target data and the decrypted data are not identical, that is, in the case of determining that the mobile terminal 50A is not the target mobile terminal (i.e., the mobile terminal 50B) (NO in S40), the CPU 32 sends a disconnection request that requests to disconnect the WFD connection to the mobile terminal 50B in T990, and disconnects the WFD connection with the mobile terminal 50B in T992. T994 and T996 are the same as T394 and T396 of FIG. 5.

As described above, the printer 10 receives the encryption key from the mobile terminal 50A (T907) in the case of establishing the NFC connection with the mobile terminal 50A. After this, after having established the WFD connection with the target mobile terminal (i.e., mobile terminal 50A or mobile terminal 50B) (T950), the printer 10 encrypts the target data by using the stored encryption key (T962), sends the Challenge request including the encrypted data to the target mobile terminal (T970), and receives the Challenge response including the decrypted data from the target mobile terminal (T974). In this case, the printer 10 determines whether or not the mobile terminal 50A is the target mobile terminal (S40) by using the target data and the decrypted data. In the case of determining that the mobile terminal 50A is not the target mobile terminal (NO in S40), that is, in the case where the target mobile terminal is the mobile terminal 50B which is different from the mobile terminal 50A, the printer 10 disconnects the WFD connection with the mobile terminal 50B (T992). As above, since the WFD connection with the mobile terminal 50B which is different from the mobile terminal 50A is disconnected, the printer 10 can thereafter suitably establish the WFD connection with the mobile terminal 50A.

Although not shown in the drawings, in a case where an NFC connection is established between the printer 10 and the mobile terminal 50A under the situation in which the printer 10 is in the G/O state, processes same as those of FIG. 11 are executed, except that the G/O Negotiation is not executed (e.g., T944, T946, etc. are not executed) and that T994 is not executed.

(Corresponding Relationships)

The encryption key received in T907 and the decrypted data received in T974 are respectively examples of "first specific information" and "second specific information". The process of T907, the process of T950, the process of T974, the process of S40, and the process of T990 are respectively examples of "receive first specific information", "establish a second wireless connection", "receive second specific information", "determine whether the first terminal device is identical to the second terminal device", and "disconnect the second wireless connection".

(Variant 1) In T307 of FIG. 5, the CPU 32 may receive a device name of the mobile terminal 50A from the mobile terminal 50A as a substitute of the MAC address "AAA" of the mobile terminal 50A. In this case, the CPU 32 stores the received device name in the memory 34 in T308, and in the case of receiving a DHCP request including a device name of the target mobile terminal from the target mobile terminal in T370, the CPU 32 determines whether or not the stored device name of the mobile terminal 50A is identical to the device name in the DHCP request. In the present variant, the device name of the mobile terminal 50A and the device name in the DHCP request are respectively examples of "first specific information" and "second specific information". Further, in another variant, the CPU 32 may determine whether or not the mobile terminal 50A is the target mobile terminal by using other identification information that identifies the mobile terminal 50A (e.g., UUID (abbreviation of Universally Unique Identifier)).

(Variant 2) In T370 of FIG. 5, the CPU 32 may receive the MAC address "AAA" of the mobile terminal 50A from the mobile terminal 50A by using the NFC connection. That is, "receive second specific information" does not need to utilize a second wireless connection.

(Variant 3) In T907, T908 of FIG. 11, the CPU 32 may receive a certificate including the encryption key from the mobile terminal 50A as a substitute of the encryption key, and may store the certificate in the memory 34. In this case, in response to the WFD connection with the target mobile terminal being established, the CPU 32 uses the WFD connection to send to the target mobile terminal a data request for requesting data with a certificate to be sent, and receives data with a certificate from the target mobile terminal. The CPU 32 uses the encryption key in the stored certificate to decrypt the data with the certificate and obtain the certificate, and determines whether or not the mobile terminal 50A is the target mobile terminal by determining whether or not the stored certificate and the obtained certificate are identical to each other. In the present variant, the certificate and the data with the certificate are respectively examples of the "first specific information" and the "second specific information".

(Variant 4) T360 and T374 of FIG. 5 may be omitted. That is, "put a restriction on a communication via the second wireless interface" and "release the restriction on the communication via the second wireless interface" can be omitted.

(Variant 5) The printer 10 may not support the WFD scheme, and as a substitute thereof, it may support a SoftAP scheme, for example. In this case, for example, in FIG. 5, the CPU 32 may shift from a state where a SoftAP is not activated to a state where the SoftAP is activated in response to the NFC connection with the mobile terminal 50A being established (T305). The G/O state of the WFD scheme and the state where the SoftAP is activated may collectively be called "parent station state".

(Variant 6) In T309 of FIG. 5, the CPU 32 may enable a PIN code scheme of the WPS as a substitute of the PBC mode. For example, the CPU 32 displays a PIN code on the display unit 14, and establishes the WFD connection with the target mobile terminal in a case where this PIN code is inputted to the target mobile terminal. Further, the CPU 32 may enable the PIN code scheme again in T396 as a substitute of the PBC mode. Further, in another variant, the CPU 32 may establish the WFD connecting with the target mobile terminal by using an automatic wireless setting different from the WPS (e.g., AOSS (registered trademark) etc.). In these variants, "enable a PBC mode" and "enable the PBC mode again" can be omitted.

(Variant 7) The printer 10 may be provided with a BT (abbreviation of Bluetooth (registered trademark)) I/F as a substitute of the NFC I/F 18. In this case, T305 to T307 of FIG. 5 are executed according to BT, for example. In the present variant the BT I/F is an example of "first wireless interface". Further, in another variant, the printer 10 may not be provided with either the NFC I/F 18 or the BT I/F. In this case, the Wi-Fi I/F 16 of the printer 10 may support a Wi-Fi HaLow scheme based on IEEE 802.11ah or a Wi-Fi Aware scheme based on IEEE802.11s. In this case, T305 to T307 of FIG. 5 are executed according to the Wi-Fi HaLow scheme or the Wi-Fi Aware scheme, for example. In the present variant, the Wi-Fi I/F 16 is an example of "first wireless interface" and "second wireless interface".

(Variant 8) "Communication device" may not be a printer, and may be another device such as a scanner, a multifunction device, a mobile terminal, a PC, or a server.

(Variant 9) In the respective embodiments as above, the processes of FIGS. 2, 3, 5 to 8, 10 and 11 are implemented by software (i.e., program 36), however, at least one of these processes may be implemented by hardware such as a logic circuit.

What is claimed is:

1. A communication device comprising:
   a first wireless interface;
   a second wireless interface;
   a processor; and
   a memory storing computer-readable instructions therein, the computer-readable instructions, when executed by the processor, causing the communication device to:
   in a case where a first wireless connection via the first wireless interface is established with a first terminal device, receive first specific information from the first terminal device via the first wireless interface by using the first wireless connection;
   after the first specific information has been received from the first terminal device, establish a second wireless connection via the second wireless interface with a target device, wherein the target device is one of the first terminal device and a second terminal device;
   after the second wireless connection has been established with the target device, receive second specific information from the target device;
   after receiving the second specific information from the target device, determine whether the target device is the first terminal device or the second terminal device by using the first specific information and the second specific information; and
   in a case where it is determined that the target device is the second terminal device and not the first terminal device, disconnect the second wireless connection with the target device,
   wherein in a case where it is determined that the target device is the first terminal device, the second wireless connection with the target device is not disconnected.

2. The communication device as in claim 1, wherein the second specific information is received from the target device via the second wireless interface by using the second wireless connection.

3. The communication device as in claim 2, wherein the first specific information is a MAC address of the first terminal device,
   the second specific information is a MAC address of the target device,
   in a case where the first specific information is identical to the second specific information, it is determined that the target device is the first terminal device, and
   in a case where the first specific information is not identical to the second specific information, it is determined that the target device is the second terminal device.

4. The communication device as in claim 3, wherein the computer-readable instructions, when executed by the processor, further cause the communication device to:
   while a state of the communication device is a device state of a WFD (abbreviation of Wi-Fi Direct) scheme, and after the first wireless connection has been established with the first terminal device and before the second wireless connection is established with the target device, shift the state of the communication device from the device state to a Group Owner state or a Client state of the WFD scheme, wherein in a case where the second wireless connection is established with the target device after the state of the communication device has been shifted to the Group Owner state, a first request including the second specific information being the MAC address of the target device is received from the target device via the second wireless interface by using the second wireless connection, the first request being for requesting the communication device to assign an IP address of the target device, wherein the computer-readable instructions, when executed by the processor, further cause the communication device to:

in a case where the second wireless connection is established with the target device after the state of the communication device has been shifted to the Client state, send a second request to the target device via the second wireless interface by using the second wireless connection, the second request being for requesting the target device to assign an IP address of the communication device, wherein after the second request has been sent to the target device, a response of the second request is received from the target device via the second wireless interface by using the second wireless connection, the response including the second specific information being the MAC address of the target device.

5. The communication device as in claim 2, wherein
the first specific information is an encryption key, and
the computer-readable instructions, when executed by the processor, further cause the communication device to:
generate encrypted data by encrypting target data using the encryption key; and
send the encrypted data to the target device via the second wireless interface by using the second wireless connection,
wherein the second specific information is decrypted data generated by decrypting the encrypted data by the target device,
in a case where the target data is identical to the decrypted data, it is determined that the target device is the first terminal device, and
in a case where the target data is not identical to the decrypted data, it is determined that the target device is the second terminal device.

6. The communication device as in claim 1, wherein
the computer-readable instructions, when executed by the processor, further cause the communication device to:
in a case where the second wireless connection is established with the target device, put a restriction on a communication via the second wireless interface; and
in a case where the target device is the first terminal device, release the restriction on the communication via the second wireless interface.

7. The communication device as in claim 1, wherein
the computer-readable instructions, when executed by the processor, further cause the communication device to:
while a state of the communication device is a device state of a WFD (abbreviation of Wi-Fi Direct) scheme, and after the first wireless connection has been established with the first terminal device and before the second wireless connection is established with the target device, shift the state of the communication device from the device state to a Group Owner state of the WFD scheme; and
in a case where the second wireless connection with the target device is disconnected due to the determination that the target device is the second terminal device after the state of the communication device has been shifted from the device state to the Group Owner state, shift the state of the communication device from the Group Owner state to the device state.

8. The communication device as in claim 1, wherein
the computer-readable instructions, when executed by the processor, further cause the communication device to:
in the case where the first wireless connection is established with the first terminal device, enable a PBC (abbreviation of Push Button Configuration) mode according to a PBC scheme of a WPS (abbreviation of Wi-Fi Protected Setup) standard,
wherein the second wireless connection is established with the target device by executing a predetermined communication according to the PBC mode,
the PBC mode is being disabled in a state where the second wireless connection is established, and
the computer-readable instructions, when executed by the processor, further cause the communication device to:
in a case where the second wireless connection with the target device is disconnected due to the determination that the target device is the second terminal device, enable the PBC mode again.

9. A non-transitory computer-readable recording medium storing computer-readable instructions for a communication device,
wherein the computer-readable instructions, when executed by a processor of the communication device, cause the communication device to:
in a case where a first wireless connection via a first wireless interface of the communication device is established with a first terminal device, receive first specific information from the first terminal device via the first wireless interface by using the first wireless connection;
after the first specific information has been received from the first terminal device, establish a second wireless connection via a second wireless interface of the communication device with a target device, wherein the target device is one of the first terminal device and a second terminal device;
after the second wireless connection has been established with the target device, receive second specific information from the target device;
after receiving the second specific information from the target device, determine whether the target device is the first terminal device or the second terminal device by using the first specific information and the second specific information; and
in a case where it is determined that the target device is the second terminal device and not the first terminal device, disconnect the second wireless connection with the target device,
wherein in a case where it is determined that the target device is the first terminal device, the second wireless connection with the target device is not disconnected.

10. The non-transitory computer-readable recording medium as in claim 9, wherein
the second specific information is received from the target device via the second wireless interface by using the second wireless connection.

11. The non-transitory computer-readable recording medium as in claim 10, wherein
the first specific information is a MAC address of the first terminal device,
the second specific information is a MAC address of the target device,
in a case where the first specific information is identical to the second specific information, it is determined that the target device is the first terminal device, and
in a case where the first specific information is not identical to the second specific information, it is determined that the target device is the second terminal device.

12. The non-transitory computer-readable recording medium as in claim 11, wherein
the computer-readable instructions, when executed by the processor, further cause the communication device to:
while a state of the communication device is a device state of a WFD (abbreviation of Wi-Fi Direct) scheme, and after the first wireless connection has been established with the first terminal device and before the second wireless connection is established with the target device, shift the state of the communication device from the device state to a Group Owner state or a Client state of the WFD scheme,
wherein in a case where the second wireless connection is established with the target device after the state of the communication device has been shifted to the Group Owner state, a first request including the second specific information being the MAC address of the target device is received from the target device via the second wireless interface by using the second wireless connection, the first request being for requesting the communication device to assign an IP address of the target device,
wherein the computer-readable instructions, when executed by the processor, further cause the communication device to:
in a case where the second wireless connection is established with the target device after the state of the communication device has been shifted to the Client state, send a second request to the target device via the second wireless interface using the second wireless connection, the second request being for requesting the target device to assign an IP address of the communication device,
wherein after the second request has been sent to the target device, a response of the second request is received from the target device via the second wireless interface by using the second wireless connection, the response including the second specific information being the MAC address of the target device.

13. The non-transitory computer-readable recording medium as in claim 10, wherein
the first specific information is an encryption key, and
the computer-readable instructions, when executed by the processor, further cause the communication device to:
generate encrypted data by encrypting target data using the encryption key; and
send the encrypted data to the target device via the second wireless interface by using the second wireless connection,
wherein the second specific information is decrypted data generated by decrypting the encrypted data by the target device,
in a case where the target data is identical to the decrypted data, it is determined that the target device is the first terminal device, and
in a case where the target data is not identical to the decrypted data, it is determined that the target device is the second terminal device.

14. The non-transitory computer-readable recording medium as in claim 9, wherein
the computer-readable instructions, when executed by the processor, further cause the communication device to:
in a case where the second wireless connection is established with the target device, put a restriction on a communication via the second wireless interface; and
in a case where the target device is the first terminal device, release the restriction on the communication via the second wireless interface.

15. The non-transitory computer-readable recording medium as in claim 9, wherein
the computer-readable instructions, when executed by the processor, further cause the communication device to:
while a state of the communication device is a device state of a WFD (abbreviation of Wi-Fi Direct) scheme, and after the first wireless connection has been established with the first terminal device and before the second wireless connection is established with the target device, shift the state of the communication device from the device state to a Group Owner state of the WFD scheme; and
in a case where the second wireless connection with the target device is disconnected due to the determination that the target device is the second terminal device after the state of the communication device has been shifted from the device state to the Group Owner state, shift the state of the communication device from the Group Owner state to the device state.

16. The non-transitory computer-readable recording medium as in claim 9, wherein
the computer-readable instructions, when executed by the processor, further cause the communication device to:
in the case where the first wireless connection is established with the first terminal device, enable a PBC (abbreviation of Push Button Configuration) mode according to a PBC scheme of a WPS (abbreviation of Wi-Fi Protected Setup) standard,
wherein the second wireless connection is established with the target device by executing a predetermined communication according to the PBC mode,
the PBC mode is being disabled in a state where the second wireless connection is established, and
the computer-readable instructions, when executed by the processor, further cause the communication device to:
in a case where the second wireless connection with the target device is disconnected due to the determination that the target device is the second terminal device, enable the PBC mode again.

* * * * *